United States Patent [19]

Ukai et al.

[11] Patent Number: 4,735,596
[45] Date of Patent: Apr. 5, 1988

[54] TUBULAR CORRUGATED BELLOWS-TYPE ELASTOMERIC BOOT FOR BENDABLE JOINT OF MECHANICAL ELEMENTS

[75] Inventors: Mikio Ukai, Nagoya; Yukio Kawasaki, Ichinomiya, both of Japan

[73] Assignee: Toyoda Gosei Co., Ltd., Nishikasugai, Japan

[21] Appl. No.: 902,965

[22] Filed: Aug. 29, 1986

[30] Foreign Application Priority Data

Aug. 31, 1985 [JP] Japan ................. 60-192597

[51] Int. Cl.⁴ .................................... F16D 3/84
[52] U.S. Cl. ................. 464/175; 277/212 FB
[58] Field of Search ............. 277/212 FB; 464/175; 403/50

[56] References Cited

U.S. PATENT DOCUMENTS

| | | | |
|---|---|---|---|
| 3,016,721 | 1/1962 | Davis | 464/175 X |
| 3,204,427 | 9/1965 | Dunn | 464/175 X |
| 3,688,523 | 9/1972 | Schafer | 464/175 |
| 4,278,262 | 7/1981 | Mizutani et al. | 277/212 FB |
| 4,559,025 | 12/1985 | Dore | 464/175 |

FOREIGN PATENT DOCUMENTS 1525900 9/1969 Fed. Rep. of Germany .
8132242 3/1982 Fed. Rep. of Germany .
3140514 11/1984 Fed. Rep. of Germany .

Primary Examiner—Daniel P. Stodola
Attorney, Agent, or Firm—Cushman, Darby & Cushman

[57] ABSTRACT

A boot with a bellows interposed between a large-diameter ring and a small-diameter ring is disclosed. In the bellows, the crest which is the closest to the small-diameter ring is made thinner than the other crests. Accordingly, when the boot is mounted on a mechanical shaft joint, the crest closest to the small-diameter ring is folded preferentially, so that the pitches of the other crests are maintained. The other crests are not brought into contact with each other during the cross movement of the mechanical shaft joint or even if they come into contact with each other, the contact pressure reduced, and the durability is thereby enhanced.

4 Claims, 4 Drawing Sheets

4,735,596

TUBULAR CORRUGATED BELLOWS-TYPE ELASTOMERIC BOOT FOR BENDABLE JOINT OF MECHANICAL ELEMENTS

BACKGROUND OF THE INVENTION

The present invention relates to an improved mechanical shaft joint boot made of a thermoplastic elastomeric resin, this boot having a bellows between a large-diameter ring and a small-diameter ring and, more particularly, to a mechanical shaft joint boot (hereinunder referred to as "boot") suitable for a shaft joint of a constant velocity type for automobiles. In this specification, "the thickness of a crest" means the thickness of the top of a crest, i.e. its optical thickness.

Such type of a boot is compressed a little toward a shaft when it is mounted on a joint. Therefore, it is generally considered that uniform dispersion of the deformation of the boot in the bellows will improve the durability of the boot and, as shown in FIG. 1, for example, the crests of the bellows 7 are formed in such a manner that the first cresh (hereinunder the crests are numbered first, second, ... in order, from the small ring of the bellows) having the smaller diameter has a larger thickness than the other crests. Therefore, when the boot shown in FIG. 1 is mounted on a joint, the pitch of each crest is made shorter by substantially $(L-l)/5$, as is indicated by the broken line in FIG. 1, wherein L represents the length of the boot before it is mounted on the joint, and l the length of the boot after it is mounted on the joint.

The reference numeral 3 denotes a large-diameter ring.

As a result of investigation on the durability of such a boot, the present inventors found the following problems:

When such a boot is mounted on a joint, since a pitch between each crest is made shorter, interference (contact) between the crests and a bending (kinking) phenomenon are likely to be produced at the crest on the side of the large-diameter ring 3 during the cross movement (i.e. arcuate flexing) of the joint. As a result, in particular, the boot shown in FIG. 1 involves a risk of producing a damage due to wear and lowering the durability.

SUMMARY OF THE INVENTION

Accordingly, it is an object of the present invention to provide a mechanical shaft joint boot in which the crests other than the first crest are not brought into contact with each other during the crossing movement of the mechanical shaft.

It is another object of the present invention to provide a mechanical shaft joint boot which is capable of improving the durability of the boot by reducing the contact pressure of the crests even if the crests other than the first crest come into contact with each other, and suppressing the wear of the crests and preventing the kinking of the crests.

To achieve this aim, a boot according to the present invention is so composed that the thickness of the first crest is thinner than those of the other crests so that the first crest is folded preferentially when the boot is mounted on a mechanical shaft joint. This structure enables the pitches of the crests except the first crest to be maintained as they are when the boot is mounted on the mechanical shaft joint.

The above and other objects, features and advantages of the present invention will become clear from the following description of a preferred embodiment thereof, taken in conjunction with the accompanying drawings.

DESCRIPTION OF THE PREFERRED EMBODIMENTS

The structure of the present invention will be described in detail with reference to the boot shown in FIG. 3.

Figure 1:
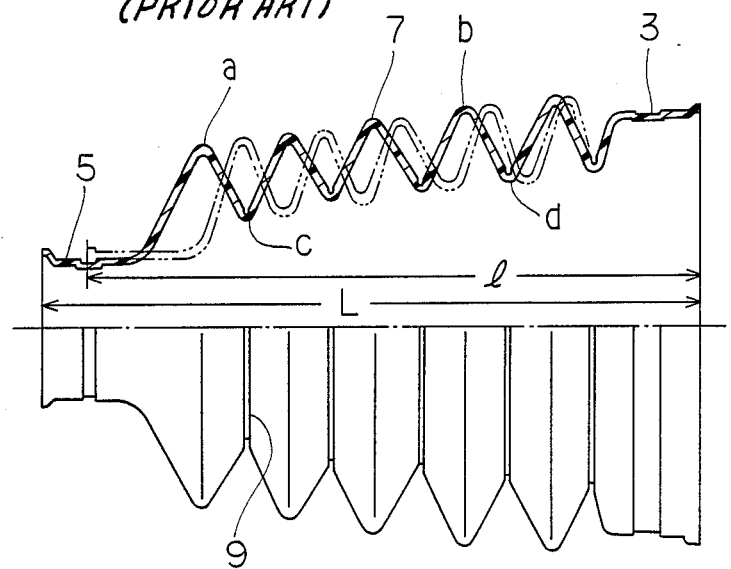
FIG. 1 is a half sectional view of a conventional boot.

This boot is composed of a large-diameter ring 3′, a small-diameter ring 5′, and a bellows 7′ interposed therebetween. The boot is mounted on a joint by fastening the small-diameter ring 5′ to a rotary shaft and the large-diameter ring 3′ to a housing, respectively, by clamps or the like. The boot of this embodiment is different from the boot shown in FIG. 1 in that a first crest a′ is made thinner than the other crests. The first crest is preferably made thinner to such an extent that the value of the average thickness of the first crest with respect to the average thickness of the other crests is 0.2 to 0.9. More preferably, the mean value of their thickness is 0.4 to 0.7. Such thinness of the first crest is formed by (1) controlling the parison during injection blow molding (making the parison portion which is to be the first crest thinner), (2) making the radius of curvature of the first crest smaller (whereby the material is unlikely to flow to the crest), or (3) forming a groove in the circumferential direction of the first crest. Thus, when the boot is mounted on the joint, only the first crest a′ which has the smaller rigidity is folded and the pitches of the second to fifth crests hardly change between before and after the mounting of the boot on the joint.

It may be considered that the pitches of the second to fifth crests are maintained by making a first trough c′ have a smaller rigidity so as to be folded when the boot mounted on the joint, but since the compression-elongation distortion of the joint during the crossing movement is more greatly applied to the troughs than to the crests, it is not desirable to make the rigidity of the troughs small. As will be later described with reference to the results obtained from experiments, when the durability of the crests are improved, the durability of the boot is controlled by the durability of the troughs.

The reference numeral 9′ denotes a groove formed in the outer circumferential direction of the troughs and serves to prevent the surface contact of the bellows 7′ at the time of compression during the crossing movement.

The boot 1′ is made of a thermoplastic elastormer of polyolefin, polyester, polyurethane, or polyvinyl group by blowing (e.g., injection blow molding).

Figure 2:
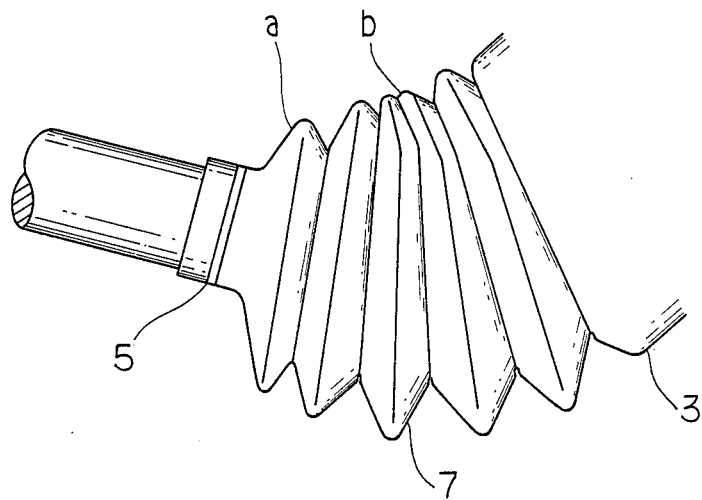
FIG. 2 shows the deformation of a conventional boot produced during a cross movement of a joint.
Figure 3:
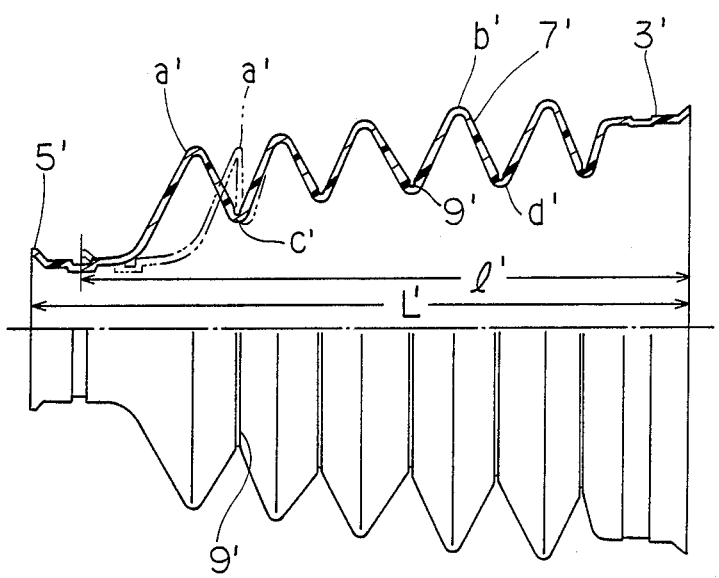
FIG. 3 is a half sectional view of an embodiment of a boot according to the present invention.

In the boot having the above-described structure, when it is mounted on a joint, the first crest is folded preferentially, the second to fifth crests are hardly folded, as indicated by the broken line in FIG. 3. The pitches of the second to fifth crests hardly change after the boot is mounted on the joint, and the pitches thereof therefore remain longer as compared with those in the prior art (see FIG. 1). Accordingly, during the crossing movement of the joint as shown in FIG. 2, the crests on the side of the large-diameter ring do not come into contact with each other, or even if they come into contact with each other, the contact pressure is reduced. The reduced pressure contact reduces the axial force of the boot which is applied to the crests of the large-diameter ring side, which leads to little possibility of the generation of kinking phenomenon.

At the crests (the first crest a' and the second crest in FIG. 3) on the side of the small-diameter ring interference is produced, but, as is clear from FIG. 2, since the deformation amount (compression-elongation distortion) of the crests on the small-diameter ring side during the crossing movement of a joint, there is little possibility of the interference of the crest of the small-diameter ring side adversely influencing the durability of the boot.

[Example]

The results of a durability test for the boot of this embodiment will be described in the following.

Figure 4:
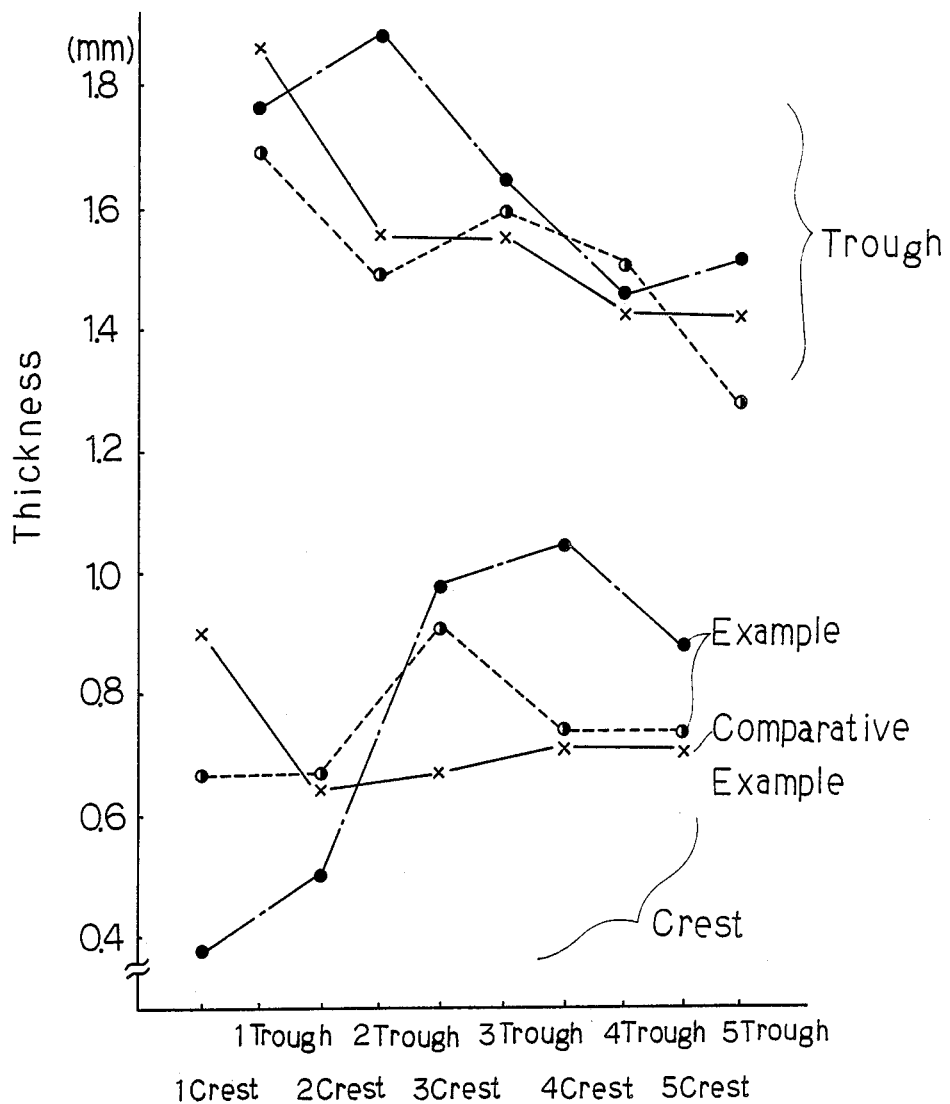
FIG. 4 is a graph showing the thickness of each crest and trough of the comparative example and the example of the present invention.

Boots as that shown in FIG. 3 were made of a polyester TPE material by injection blow molding such as to have the thickness of each crest and trough indicated by the marks "◐" and "●" shown in FIG. 4. The marks "x" in FIG. 4 represent the thicknesses of the comparative example boot shown in FIG. 1.

The boots obtained were mounted on a respective joint with joint grease, sealed and crossing movement was imparted to the joints under the following conditions:

Maximum crossing angle: 39 degrees
Rotational speed: 350 rpm
Atmospheric temperature: 100° C.

Figure 5:
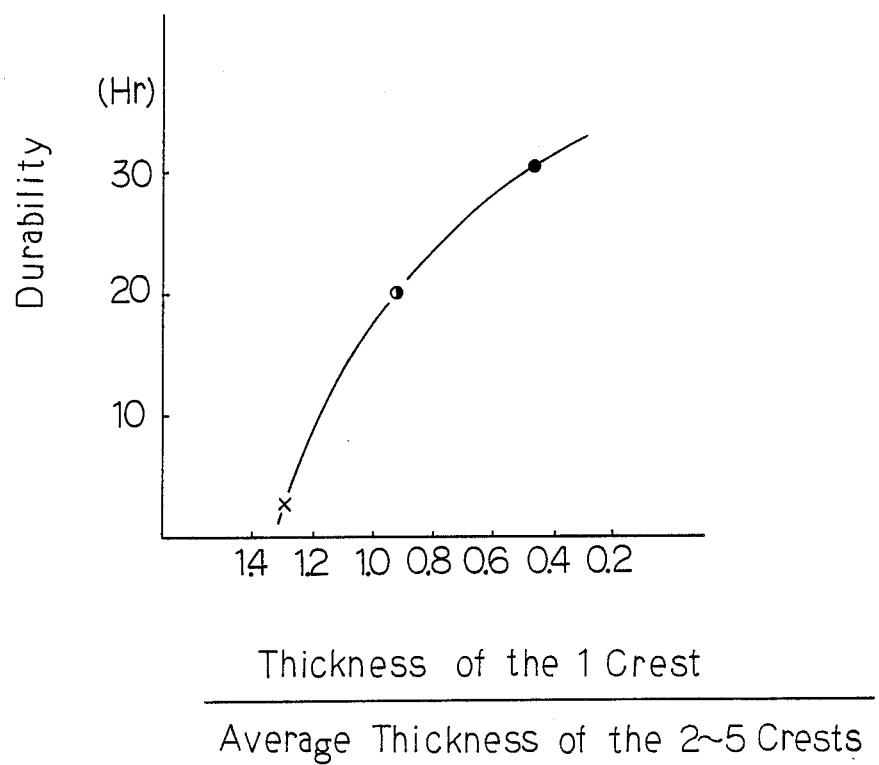
FIG. 5 is a graph showing the relationship between a change in thickness of the first crest and the durability of the boot.

The durabilities of the boots were judged by the generation of cracks. FIG. 5 shows the results of plotting the durabilities of the joints with respect to the ratio of the thickness of the first crest to the average thickness of the second to fifth crests. A crack was produced at the fourth trough d' in the embodiment of the present invention, while a crack was produced at the fourth crest b in the conventional boot.

From the results shown in FIG. 5, it will be understood that the durability of the boot with the first crest having a thin thickness is 10 to 20 times that of the comparative example boot and that the thinner the thickness of the first crest, the longer the durability of the boot.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A mechanical shaft joint boot comprising:
   (a) a large-diameter ring adapted to be circumferentially secured on a first joint member;
   (b) a small-diameter ring adapted to be circumferentially secured on a second shaft-type joint member;
   (c) a bellows interposed axially between and integral with said large-diameter ring and said small-diameter ring, said bellows comprising alternating series of circumferentially extending crests and grooves respectively comprising at least three crests and at least three grooves, which alternating series begins adjacent said small-diameter ring with a first crest and ends adjacent said large-diameter ring with a last groove; and
   (d) said first crest of said bellows being apically thinner in wall thickness than any other said crest in said series, whereby said first crest is adapted to be folded preferentially relative to said other crests when said boot, in use, is arcuately flexed.

2. A mechanical shaft joint boot according to claim 1, wherein said thickness of said first crest is 0.2 to 0.9 times the average thickness of said other crests.

3. A mechanical shaft joint boot according to claim 1, wherein said thickness of said first crest is 0.4 to 0.7 times the average thickness of said other crests.

4. A mechanical shaft joint boot according to claim 1, wherein said boot is formed of blow-molded thermoelastic plastic resin material.

* * * * *